United States Patent [19]
Johnson

[11] 3,832,006
[45] Aug. 27, 1974

[54] DISTRIBUTING APPARATUS FOR PNEUMATIC CONVEYOR

[76] Inventor: John A. Johnson, Rt. 2, Box 692E, Coos Bay, Oreg. 97420

[22] Filed: Feb. 5, 1973

[21] Appl. No.: 329,601

[52] U.S. Cl............. 302/60, 214/15 E, 214/17 CB, 302/10
[51] Int. Cl............................................ B65g 53/42
[58] Field of Search......... 193/16, 22, 23; 214/15 E, 214/17 C, 17 CB; 302/10, 60, 61, 63

[56] References Cited
UNITED STATES PATENTS

| | | | |
|---|---|---|---|
| 891,608 | 6/1908 | Draper et al. | 302/60 |
| 963,583 | 7/1910 | Kennel | 302/60 X |
| 2,010,312 | 8/1935 | McIntire | 302/60 X |
| 2,808,295 | 10/1957 | Caron | 302/60 |
| 3,206,044 | 9/1965 | Schwichtenberg | 302/60 X |
| 3,269,780 | 8/1966 | Hanson | 302/60 |
| 3,485,536 | 12/1969 | Donelson | 302/60 |

FOREIGN PATENTS OR APPLICATIONS

| | | | |
|---|---|---|---|
| 691,504 | 4/1963 | Italy | 214/17 CB |

Primary Examiner—Evon C. Blunk
Assistant Examiner—W. Scott Carson
Attorney, Agent, or Firm—Kolisch, Hartwell, Dickinson & Stuart

[57] ABSTRACT

A pneumatic conveyor system with distributing apparatus for controlling the direction in which pneumatically conveyed material is ejected from the system. The distributing apparatus includes a delivery conduit section normally depending from the discharge end of a pneumatic conveyor conduit, and a nozzle section receiving material from this delivery conduit section. The delivery conduit and nozzle sections may each include elbow or bend portions, with the bend portion of one forming substantially a continuation of the bend portion of the other. Power-operated relative adjustments of the nozzle section with respect to the delivery conduit section, and the delivery conduit section with respect to the pneumatic conveyor conduit, provide means for changing the direction in which material is ejected from the system. The nozzle section and the delivery conduit section form an adjustably positionable, sealed conduit means usable in the controlled discharge of bulk materials.

1 Claim, 6 Drawing Figures

DISTRIBUTING APPARATUS FOR PNEUMATIC CONVEYOR

This invention relates to pneumatic conveyor systems generally, and more particularly to distributing apparatus for controlling the direction in which pneumatically conveyed material is ejected from the system.

The invention is described herein in connection with the loading of a hold of a ship or other container with particulate material such as grain, wood chips and the like. It should be understood, however, that in describing the particulars of an installation exemplifying a preferred embodiment of the invention, it is not intended to be limited to the specifics or environment of the particular installation, as it is appreciated that the distributing apparatus of the invention has general applicability under conditions where control over the ejection of pneumatically conveyed material is desired.

In distributing material ejected from a pneumatic conveyor system, various forms of apparatus have been proposed in the past, but to my knowledge most have been subject to a number of disadvantages. A principal deficiency of many forms of equipment is an inability to direct the airborne material whereby such will properly fill up and be compacted within regions of the hold or other space for receiving the material remote from the distributing device. The trajectory of the material after such leaves the pneumatic conveyor system has insufficient length to permit the material to be carried into remote regions of the hold. Thus, and in considering the hold of a ship, difficulties have been experienced in properly filling the so-called wing regions located laterally of the hatch opening for the hold and under the deck or other means which bounds the top of the hold.

Obviously, if these regions are not completely filled with properly compacted material, the ship or cargo vessel is underloaded, which is detrimental from an economic standpoint. Wood chips, for example, are a relatively light material, and most nearly to approach the tonnage capacity of a vessel when loaded with such material requires that proper compaction and filling of all voids take place. Other disadvantages characterizing prior art pneumatic conveying systems include the tendency of some systems to cause damage to the material being conveyed, by reason of the material through impact with the walls of the conveyor system tending to be broken, bruised or otherwise damaged. This is most apparent when high velocities are used, and where the conduit of the conveyor system causes, through deflection, the material to make a sharp change in course. In other pneumatic conveying systems there is a tendency for the material to move away from the main stream of moving air, introducing inefficiencies. Still other systems are inefficient because of excessive frictional resistance offered to the moving mass of material and air stream as such is channeled through the exhaust of the system.

Generally, therefore, one object of this invention is to provide distributing apparatus for a pneumatic conveyor system which is characterized by enabling a close degree of control over the direction in which material is ejected from the system and the distance that such travels in filling up selected regions of a hold or other space, be it confined or not.

Another object is to provide improved distributing apparatus which permits material to be dispensed from a pneumatic conveyor system with such evenly and uniformly compacted throughout a space of relatively large cross-sectional area.

A still further object of the invention is to provide, for a pneumatic conveyor system, distributing apparatus which is suited for handling material at a relatively high velocity without introducing damage to such material.

A related object is to provide distributing apparatus capable of handling efficiently a relatively large volume of material over a given period of time.

The distributing apparatus contemplated handles material being ejected from a pneumatic conveyor system in a manner wherein the material tends to remain suspended in the main volume of moving air carried by the system. The construction of the apparatus is such as to introduce minimal frictional drag to the material handled.

These and various other objects and advantages will become more fully apparent as the following description is read in conjunction with the accompanying drawings, wherein.

Figure 1:
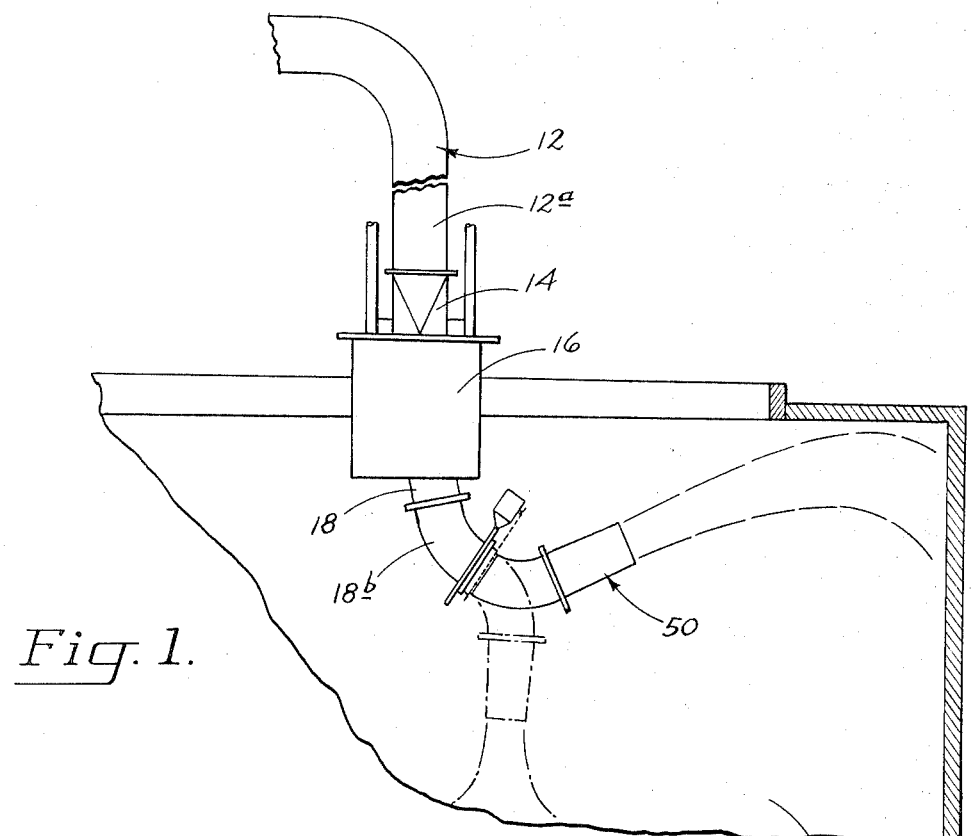
FIG. 1 is a view, somewhat simplified, illustrating portions of a pneumatic conveyor system equipped with the distributing apparatus of the invention controlling ejection of material from the system into a space, exemplified by the hold of a ship.

Referring now to the drawings, and first of all more particularly to FIG. 1, indicated generally at 10 are portions of a space which is to be filled with particulate material. For the purpose of explaining the invention, this space may be considered part of a hold of a ship or vessel, and the particulate material handled wood chips. The particulate material or chips, are conveyed from a storage region (not shown) and along a pneumatic conveyor system including a conveyor conduit partially illustrated at 12. This conveyor system includes the usual blower, which in operation functions to produce a moving air stream in conveyor conduit 12, with the particulate material entrained in such air stream and thus conveyed along the conveyor conduit by the air stream.

Conveyor conduit 12, which throughout much of its length typically might have a square or rectangular cross section, has a discharge end portion 12a which in the particular embodiment of the invention illustrated is disposed vertically. This discharge end portion, as well as the remainder of the conveyor conduit, are suitably supported in an elevated position above the hold of the vessel with the usual framework, most of which has been omitted from the drawing. The discharge end portion of the conveyor conduit includes a transition section 14 where the cross section of the conduit changes from square to round.

Figures 2, 3:
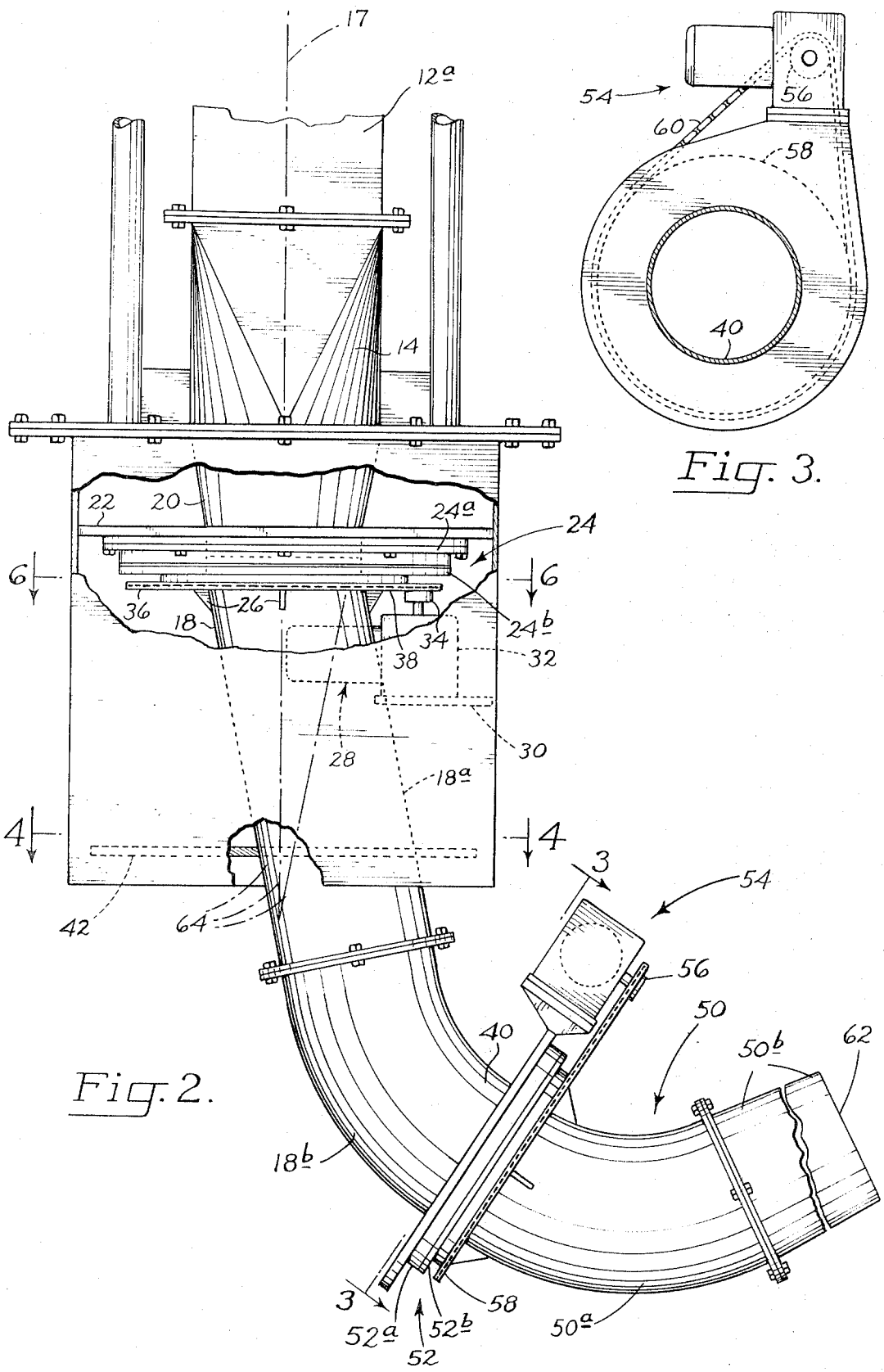
FIG. 2 is a view, on a somewhat larger scale, illustrating further details of the distributing apparatus, including a revolvable conduit section in the apparatus and a revolvable nozzle section communicating with such delivery conduit section.
FIG. 3 is a cross-sectional view taken generally along the line 3—3 in FIG. 2.

Referring now to FIGS. 1 and 2, suitably rigidly secured to the framework supporting the conduit is a hollow casing 16. As shown in the drawings, this casing is mounted with its axis extending vertically and along the axis 17 of discharge end portion 12a. This casing provides a mounting for a revolvable, so-called delivery conduit section, given the reference numeral 18, and, if desired, another transition section 20 of the conveyor conduit, where there is a reduction in the diameter of the conveyor conduit on such joining with the top or feed end of the delivery conduit section.

More specifically, as seen in FIG. 2, joined to the inner wall of casing 16, adjacent its top, is a mounting flange 22 which encircles transition section 20. This mounting flange mounts a bearing assembly 24, through a stationary upper part 24a of the assembly which is suitably secured to flange 22. Lower, relatively rotatable part 24b of the assembly is rotatably mounted on the upper part through the usual bearings (not shown). Delivery conduit section 18 is integrally joined by means including gussets 26 to this lower, relatively rotatable part 24b. It will be noted that the upper end of delivery conduit section 18 is centered about the vertical axis 17 of conveyor conduit 12 and casing 16. From this upper end the delivery conduit section inclines somewhat, throughout a substantially straight reach 18a of the conduit section. The angle of inclination will vary somewhat depending upon the given installation but ordinarily will be within the range of approximately 10° to 15°. From this description it will be seen that with rotation of the lower bearing part, the delivery conduit section will be caused to revolve about an upright axis corresponding to axis 17 of the conveyor conduit.

Transition section 20 is fixedly mounted in place, through suitable connections with the supporting framework of the conveyor system at the top of the transition section, and through suitable connections with the upper fixed part 24a of the bearing assembly at the base of the transition section. Within the bearing assembly a seal is provided whereby the upper and lower parts are permitted relative rotation, with the maintaining of an airtight relationship between sections 18 and 20 to inhibit the escape of air from between these parts. From this description, it will be seen that the delivery conduit section forms, in effect, an extension or continuation of the conveyor conduit. A stream of air, together with entrained material carried thereby, passes downwardly from the conveyor conduit in to the top end of the delivery conduit section communicating therewith.

Power-operated means is provided for revolving the delivery conduit section about the rotatable mounting provided by the bearing assembly. In the particular embodiment of the invention herein described, such comprises a motor assembly 28 suitably supported within the confines of the casing 16 as on a shelf 30. The motor assembly, which may be an electric motor and brake combination, transmits drive through a gear box 32 to a drive sprocket 34. Encircling the delivery conduit section adjacent the bearing assembly is an annular sprocket 36. A chain 38 trained about this sprocket and drive sprocket 34 is effective to transmit drive from the drive sprocket 34 to the annular sprocket.

Continuing with a description of the delivery conduit section, suitably joined to the base of reach 18a is an elbow or bend section 18b. Typically this may be a 45° elbow as exemplified by the particular embodiment of the invention illustrated. Such terminates in an exhaust end 40 which is offset laterally from the vertical axis of conveyor conduit 12 and which faces downwardly at an incline. This offset is the cumulative result of the incline of reach 18a and the curvature in elbow section 18b.

Figure 4:
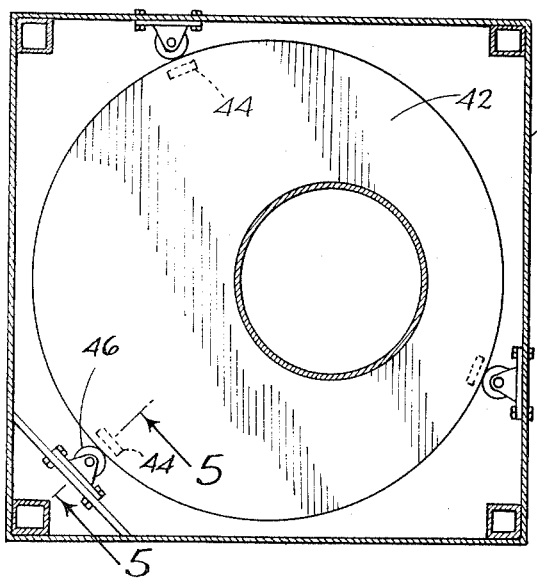
FIG. 4 is a cross-sectional view taken generally along the line 4—4 in FIG. 2.
Figure 5:
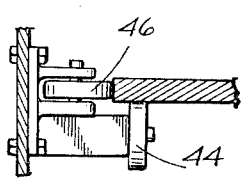
FIG. 5 is a cross-sectional view, on a slightly more enlarged scale, along the line 5—5 in FIG. 4.
Figure 6:
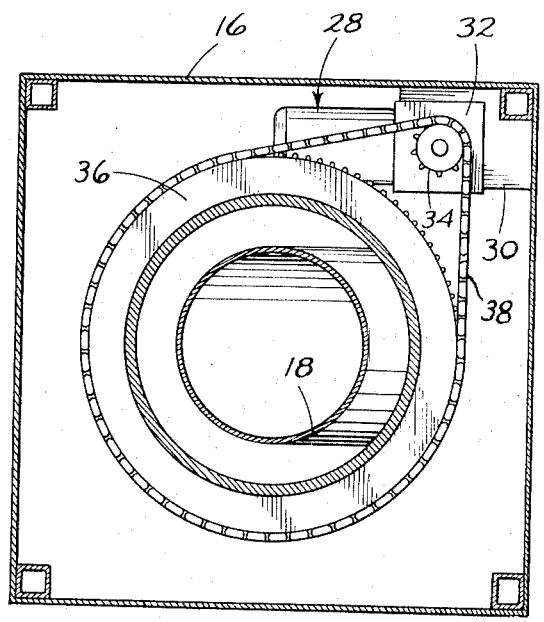
FIG. 6 is a cross-sectional view along the line 6—6 in FIG. 2.

As seen in FIGS. 2 and 4, supporting delivery conduit section 18 adjacent the base of casing 16 is a plate 42 which is suitably joined to reach 18a. Such plate, which is circular in outline, and now referring to FIGS. 4 and 5, rests on rollers 44 journaled on the casing for rotation about horizontal axes, and is restrained from lateral movement by rollers 46 journaled on the casing for rotation about vertical axes.

Referring now to FIGS. 2 and 3, communicating with the exhaust end of the delivery conduit section is what is referred to herein as a nozzle section depicted at 50. In the particular embodiment of the invention shown, such includes an elbow or bend section 50a and a straight reach 50b. While section 50a may also be a 45° elbow, certain advantages flow from use of an elbow having a greater bend, such as the 60° elbow particularly illustrated. The nozzle section is relatively rotatable with respect to the delivery conduit section by reason of the inclusion of bearing assembly 52 mounting the nozzle section on the delivery conduit section. Such bearing assembly includes a part 52a which is joined in a suitable manner to section 18 and a relatively rotatable part 52b supported for relative rotation by bearings (not shown).

Power-operated means is provided for producing rotation of the nozzle section. Such is illustrated by motor assembly 54 including motor and brake, which through gearing, drives a drive sprocket 56. Secured to lower part 52b of the bearing assembly is an annular sprocket 58, and chain 60 drivingly connects the sprockets 56, 58.

If desired, the exhaust or tip end of the nozzle section may be slightly reduced in diameter by tapering the reach 50b where such extends to discharge or exhaust end 62.

Describing the operation of the dispensing apparatus, material entrained in a stream of air is carried downwardly through the conveyor conduit into the delivery conduit section. On moving down the delivery conduit section and because of the slight incline of reach 18a, heavier material, which through momentum tends to be thrown against the side of the delivery conduit, is thrown against such side (the left side in FIG. 2) at only a slight angle. In FIG. 2 the trajectory of material moving along the sides and through the center of the conveyor conduit into conduit section 18 is designated by the dot-dashed lines 64. It will be noted that such substantially converge at a region of conduit section 18 located above any substantial curvature introduced by elbow sections 18b and 50a. The heavier material, therefore, tends to be directed in a smoothly curving path and without bouncing off the walls of the system, from delivery conduit section out through the discharge end of nozzle section 50.

The distributing apparatus may be utilized in a variety of ways to obtain proper buildup of compacted material in a space such as a ship's hold. Thus, during the dispensing of material, either the delivery conduit section, or the nozzle section, may be either revolved continuously or in steps, or held in a given adjusted position while the other instrumentality is so moved, to direct material over a wide area and at different stages into the space being filled. With repositioning of the nozzle section, for instance, from the position shown in solid outline to the position shown in dashed outline in FIG. 1, i.e., with inverting of it, material may be distributed substantially directly below the distributing apparatus. With positioning of the nozzle section at a position approximately midway between these two illustrated positions, material is dispensed in a trajectory which extends substantially in a horizontal direction. Such material, through moving along a side of the nozzle section after moving through elbow portion 50$a$, will tend to sweep over the side of the nozzle section to be ejected in a course which, for the most part, overlies the main stream of air moving from the nozzle. In this way, such moving air tends to bouy the material whereby it tends to be thrown out the greatest possible distance from the distributing apparatus. The parts of the distributing apparatus may be moved in short oscillating sweeps, or in a continuous circular path, depending upon how it is desired that loading proceed.

It will be noted that both the delivery conduit section and the nozzle section in the apparatus are round in cross section. In this way, smooth curving surfaces are presented in those regions where material is deflected to change the direction of its travel; and, as already partially explained, the material moves in a sweeping course on being channeled through the delivery conduit and nozzle sections, without encountering crevices or wall surfaces converging at a sharp angle.

The apparatus contemplated can handle particulate material carried in an air stream at substantial velocities, without breaking up the material or causing other damage. As a consequence, for a given size of installation, the volume of material handled over a given period of time may be substantial.

It should be noted that the delivery conduit section and the nozzle section form a conduit means channeling the material which may be described as a closed tube terminating in the open discharge or exhaust end of the nozzle section. With adjustments made in this closed tube, the direction in which this open end faces may be changed to change the direction in which discharge takes place. The organization contemplated provides maximum control of the direction in which the material is thrown from the system and the distance that such travels on being discharged from the system.

It should be understood that a specific embodiment of the invention has been described and illustrated herein for purposes of illustration. Variations and modifications of the invention will suggest themselves to those skilled in the art.

It is claimed and desired to secure by Letters Patent:

1. In a pneumatic conveyor system, the combination of a conveyor conduit having a discharge end portion with the axis thereof extending substantially vertically, said end portion terminating in an end opening that faces downwardly, a delivery conduit section depending from the discharge end portion of said conveyor conduit and connecting with said end opening of the conveyor conduit to form a continuation thereof, said delivery conduit section being relatively rotatably mounted on said end portion of said conveyor conduit, said delivery conduit section having a lineal reach at its upper end which extends downwardly from the discharge end of the conveyor conduit with the axis of said reach slightly inclined from the axis of said conveyor conduit, said reach having a length whereby lines extended from the sides of the conveyor conduit at said end opening converge on a side region of said reach so that material moving from the conveyor conduit tends to be directed against said side region, said delivery conduit section further including a bend portion joining with the base of said reach which progressively curves away from verticality and which terminates at an exhaust end opening for the delivery conduit section which exhaust end opening occupies a plane substantially tilted from the vertical and is offset laterally from the substantially vertical axis of the discharge end portion of the conveyor conduit, said exhaust end opening of the delivery conduit section being positionable while so offset to different positions distributed about the axis of the discharge end of the conveyor conduit with rotation of the delivery conduit section relative to said end portion of said conveyor conduit, a nozzle section communicating with the exhaust end opening of said delivery conduit section, said nozzle section being relatively rotatably mounted for rotation about an axis normal to said tilted plane to place the nozzle section in different relatively adjusted positions, said nozzle section including an open ejection end communicating with the atmosphere and a bend portion leading to said ejection end forming a continuation of the bend portion in said delivery conduit section which bend portion is effective to place said ejection end in a position facing downwardly with the nozzle section occupying a given adjusted position with respect to the delivery conduit section, and power-operated means for rotating said delivery conduit section with respect to the discharge end portion of the conveyor conduit section and said nozzle section with respect to said bend portion of the delivery conduit section.

* * * * *